United States Patent [19]
Takeshima et al.

[11] Patent Number: 5,920,351
[45] Date of Patent: Jul. 6, 1999

[54] BLACK LEVEL DETECTING CIRCUIT OF VIDEO SIGNAL

[75] Inventors: Masahiro Takeshima, Takatsuki; Atsuhisa Kageyama, Ibaraki, both of Japan

[73] Assignee: Matsushita Electric Industrial Co.,LTD., Osaka, Japan

[21] Appl. No.: 09/034,020

[22] Filed: Mar. 2, 1998

[30] Foreign Application Priority Data

Mar. 3, 1997 [JP] Japan ..................................... 9-047520

[51] Int. Cl.⁶ ...................................................... H04N 5/68
[52] U.S. Cl. ........................................... 348/379; 348/673
[58] Field of Search ................................... 348/377, 380, 348/173, 174, 678, 673, 687; H04N 5/68

[56] References Cited

U.S. PATENT DOCUMENTS

| | | |
|---|---|---|
| 3,976,836 | 8/1976 | Wheeler . |
| 4,587,554 | 5/1986 | Tamura et al. ........................... 348/379 |
| 5,410,222 | 4/1995 | Flickner ................................. 348/379 |

FOREIGN PATENT DOCUMENTS 2-12427  1/1990  Japan .

Primary Examiner—Victor R. Kostak
Attorney, Agent, or Firm—McDermott, Will & Emery

[57] ABSTRACT

A black level detecting circuit compares an input video signal with a current minimum value of input video signals, then detects a difference between the input signal and the current minimum value when the input value is smaller than the current minimum value, and then outputs the detected difference only during a detecting period of the black level, then corrects the minimum value by using this output for renewing the current minimum value, and finally outputs this renewed minimum value as a new minimum value of the input video signal. The black level detecting circuit also latches the minimum value during the vertical blanking pulse and initializes the minimum value during a vertical blanking period so as to detect a black level of the input signal. As such, the black level detecting circuit measures the black level only during a video period, thereby reducing detection errors due to noises, and also an automatic initialization of the minimum value during a blanking period can contribute to a more stable detection of the black level. The black level detected can be used effectively as a control signal over picture quality for each field or each frame.

13 Claims, 8 Drawing Sheets

$$Z_1' = \frac{1}{2}(Z_0 + Z_1)$$

$$Z_2' = \frac{1}{2}(Z_1' + Z_1)$$

$$Z_3' = \frac{1}{2}(Z_2' + Z_1)$$

$$Z_4' = \frac{1}{2}(Z_3' + Z_1)$$

BLACK LEVEL DETECTING CIRCUIT OF VIDEO SIGNAL

FIELD OF THE INVENTION

The present invention relates to a black level detection circuit of a video signal, and more particularly it relates to a detection circuit which can detect a black level with more accuracy so that the detected black level may be utilized for controlling a video display.

BACKGROUND OF THE INVENTION

A conventional black level detection circuit of a video signal was laid open with the JPO unexamined publication No. H02-12427. FIG. 8 is a block diagram of the conventional black level detection circuit of a video signal.

A comparator 21 outputs a high level signal to a first input terminal of an AND circuit 22 when a sampled value newly fed into the comparator 21 is smaller than the current minimum value of the received video signal. A subtraction circuit 23 calculates a difference between the current minimum value and the next sampled value of the video signal, and an absolute value circuit 25 finds an absolute value of the difference. A comparator 27 compares the absolute value of the difference fed from the absolute value circuit 25 with a quantizing error fed from a level setting circuit 26. When the absolute value of the difference is greater than the quantizing error, the high level signal is output from the comparator 27 to a second input terminal of the AND circuit 22. The output of the comparators 21 and 27 are fed into the AND circuit 22 and when the AND circuit 22 outputs the high level signal, a latch circuit 24 holds the new sampled value and then renews the current minimum value.

When using the above structure, a drift due to the quantizing error can be avoided when measuring the minimum value, however; noises other than the quantizing error have contributed to an error in detecting the black level, e.g. when impulse noise, such as, negative noise spikes, lower than the black level is included in the video signal, the impulse noise is detected as the black level of the video signal by mistake. As a result, when using this erroneous result of the black level detection as an automatic control signal over a brightness and a contrast in displaying a video, the video is inappropriately adjusted apart from an actual image, thereby producing a video uncomfortable to watch.

Further, when using the above conventional structure, minimum values are continually detected, whereby noises outside the video signal period such as a blanking period may be detected. If this result of the black level detection is used as the automatic control signal over the brightness and contrast in displaying the video, it further degrades the picture quality.

SUMMARY OF THE INVENTION

The present invention addresses the above problems and aims to provide a black level detection circuit of a video signal comprising the following elements:

(a) a difference detection circuit which compares an input signal with a current minimum value of the video signal (i,e., the previous minimum value until the given point in time), and detects a difference therebetween only when the input video signal is smaller than the current minimum value, (b) a switching circuit which outputs the output of the difference detection circuit only during a detection period of the black level of the video signal, (c) a minimum value renewal circuit which renews (i.e., updates) the current minimum value with a new current minimum value when appropriate, and which initializes the current minimum value during a vertical blanking period, and (d) a latch circuit which latches and outputs an output of the minimum value renewal circuit during the vertical blanking pulse.

The black level detection circuit of the video signal can thus decrease detection errors due to noise by measuring a black level only during a video period of the video signal, and also can detect a stable black level by initializing automatically a minimum value during a blanking period. As a result, a detected black level can be used effectively as a signal which controls a picture quality field by field, or frame by frame. This detection result may be used as an automatic control signal over a brightness and a contrast when displaying a video, whereby a display can be adjusted appropriately responsive to an actual image to show a video more comfortable to watch.

The black level detection circuit of the video signal according to the present invention further comprises the following elements:

(e) a first detection-sensitivity-adjustment circuit which adjusts the sensitivity of black level detection by multiplying a specified value by an initial value which is used for initializing the output from the minimum value renewal circuit, and (f) a second detection-sensitivity-adjustment circuit which divides the output from the minimum value renewal circuit by the specified value used in the first detection-sensitivity-adjustment circuit before outputting the same.

An output from the second detection-sensitivity-adjustment circuit is provided to the latch circuit. A minimum value is thus initialized by the minimum value renewal circuit during the vertical blanking pulse, and the initial value is multiplied by the specified value with the first detection-sensitivity-adjustment circuit. The black level extracted from the input video signal is compared with the initial value multiplied by the specified value. When the extracted black level is smaller than this multiplied initial value, a difference therebetween is computed. The minimum value initialized by the minimum value renewal circuit is corrected to be renewed by using the difference, and then the renewed minimum value is divided by a specified value before tapping off (i.e., outputting the same). As such, because the difference is not output as it is, the above operation is repeated again and again before the black level is extracted. As a result of this delay action, the extracted minimum value should not be reflected directly to the detection result, thereby avoiding a detection error due to impulse noise.

Thus, when using this detection result for a video display control, a stable video without flickers, etc. can be displayed.

Each element described above is detailed more specifically as follows:

The difference detection circuit comprises;

(a) an A/D converter (Analog to Digital converter),
(b) a first subtracter which receives an output data from a divider (described later) as well as a video signal as an output from the A/D converter, and outputs a result of subtracting the video signal from the output data of the divider, and (c) a first limitter which receives the output from the subtracter, and outputs "0" (i.e., a logic "0") when the input value is not more than "0", or outputs the input value when the input value equals another value than "0".

The switching circuit comprises; the AND gate which receives both a detection-period-pulse which equals "1" (i.e., a logic "1") only during a black-level-detecting-period and equals "0" for other periods and an output from the first limitter, and then the AND gate outputs the output from the first limitter when a detection-period-pulse equals "1" and outputs "0" when the detection-period-pulse equals "0".

The first detection-sensitivity-adjustment circuit comprises;

a multiplier which receives the initial value for initializing the black level of the video signal as well as a set-detection-sensitivity-value (a specified value) which sets a detection sensitivity of the black level, and outputs a result of multiplying these two values.

The minimum value renewal circuit comprises;

(a) a selector which receives an output from the multiplier, an output from a second limitter (described later), and a vertical-blanking-trigger-pulse which represents a vertical blanking period of the video signal, and then outputs an output data from the multiplier during the vertical blanking pulse as well as an output data from the second limitter (described later) during the periods other than the vertical blanking period, (b) a second subtracter which receives an output from the selector and an output from the gate before outputting a result of subtracting the gate output from the selector output, (c) the second limitter which receives an output from the second subtracter, and outputs "0" when the reception value is not more than "0", or outputs the reception value as it is when the reception value is more than "0".

The second detection-sensitivity-adjustment circuit comprises:

a divider receiving an output from the second limitter as well as a detection-sensitivity-set-value which sets a detection sensitivity for the black level, and dividing the output from the second limitter by the detection-sensitivity-set value (an output from the divider is fed to the first subtracter.)

The cyclic filter comprises;

(a) an amplifier which receives a black level detection output as well as a setting value of an amplifier gain "k", and amplifies the black level detection output according to the setting value by k/(1-k) times, where 0<k<1, (b) an adder which adds an output from the divider to an output from the amplifier of which amplification is k/(1-k), and outputs an addition result, (c) another amplifier which receives an output from the adder as well as the setting value of the amplifier gain "k" and amplifies an output from the adder by (1-k) times according to the setting value, (d) a latch circuit which receives an output of the amplifier of which amplification is (1-k), and is triggered by the vertical blanking pulse to tap off the black level detection result.

The black level detection circuit having the above detailed structure thus can detect the black level of the video signal without being affected by noises.

Figures 2A, 2B, 2C, 2D, 2E, 2F:
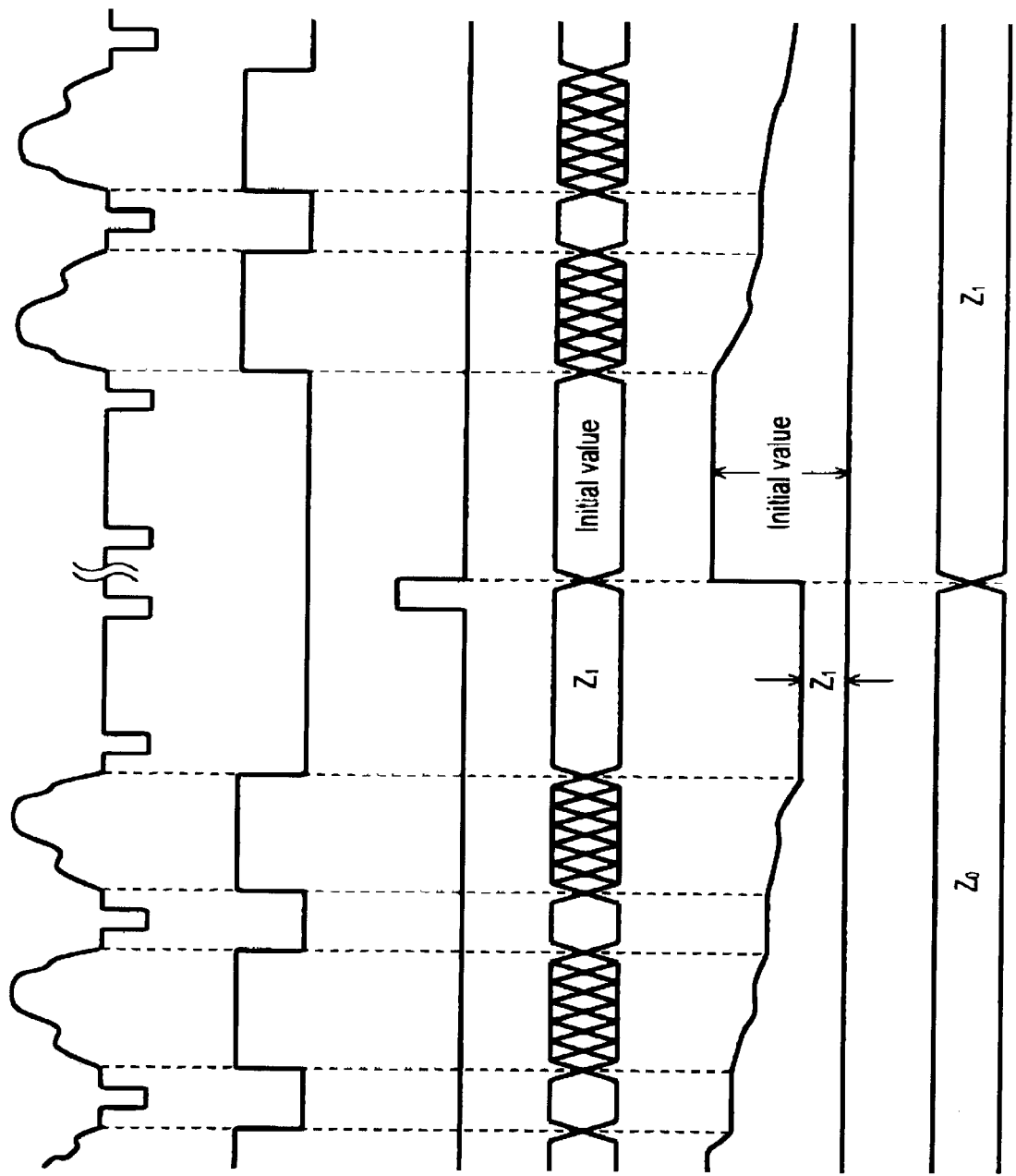
FIGS. 2A–2F show waveforms depicting an operation of Embodiment 1.

More specifically:

FIG. 2(A) illustrates a waveform of an analog input video signal,

FIG. 2(B) illustrates a waveform of a detection period pulse,

FIG. 2(C) illustrates a waveform of a vertical blanking pulse,

FIG. 2(D) illustrates a waveform of detected minimum value in a digital form,

FIG. 2(E) illustrates a waveform depicting changes of a detected minimum value in analog terms, and FIG. 2(F) illustrates a waveform depicting changes of a latched detected-minimum-value.

Figure 3:
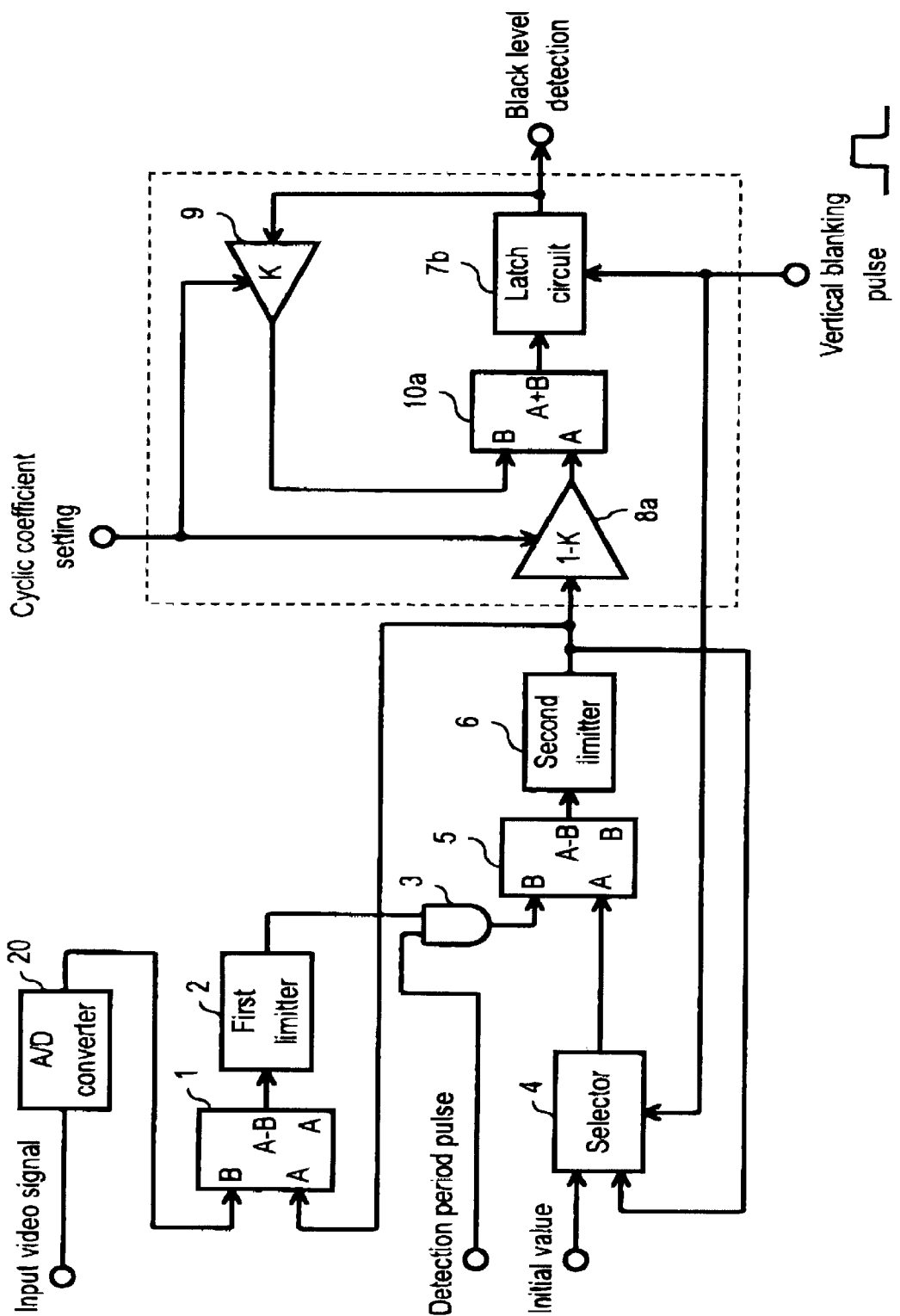

FIG. 3 is a block diagram of a black level detection circuit of a video signal according to Embodiment 2 of the present invention.

Figure 4A:
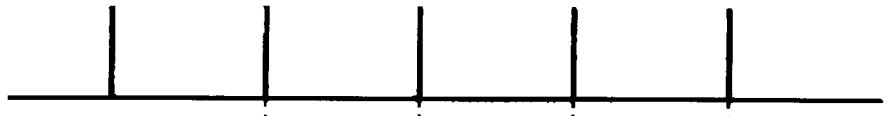
Figure 4B:
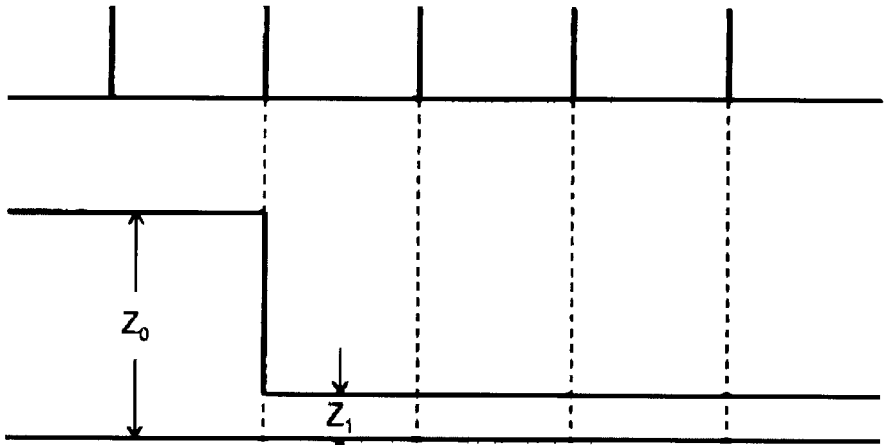
Figure 4C:
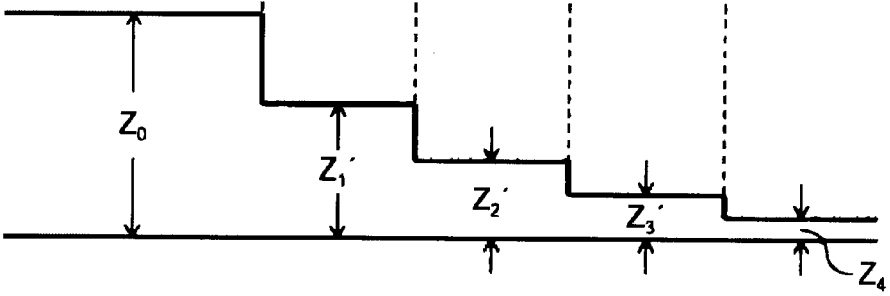

FIGS. 4A–4C show waveforms depicting a difference between an operation of Embodiment 1 and an operation of Embodiment 2.

More specifically:

FIG. 4(A) illustrates a waveform of a vertical blanking pulse,

FIG. 4(B) illustrates a waveform depicting changes of an output from a latch circuit 7a, and FIG. 4(C) illustrates a waveform depicting changes of an output from a latch circuit 7b.

Figure 5:
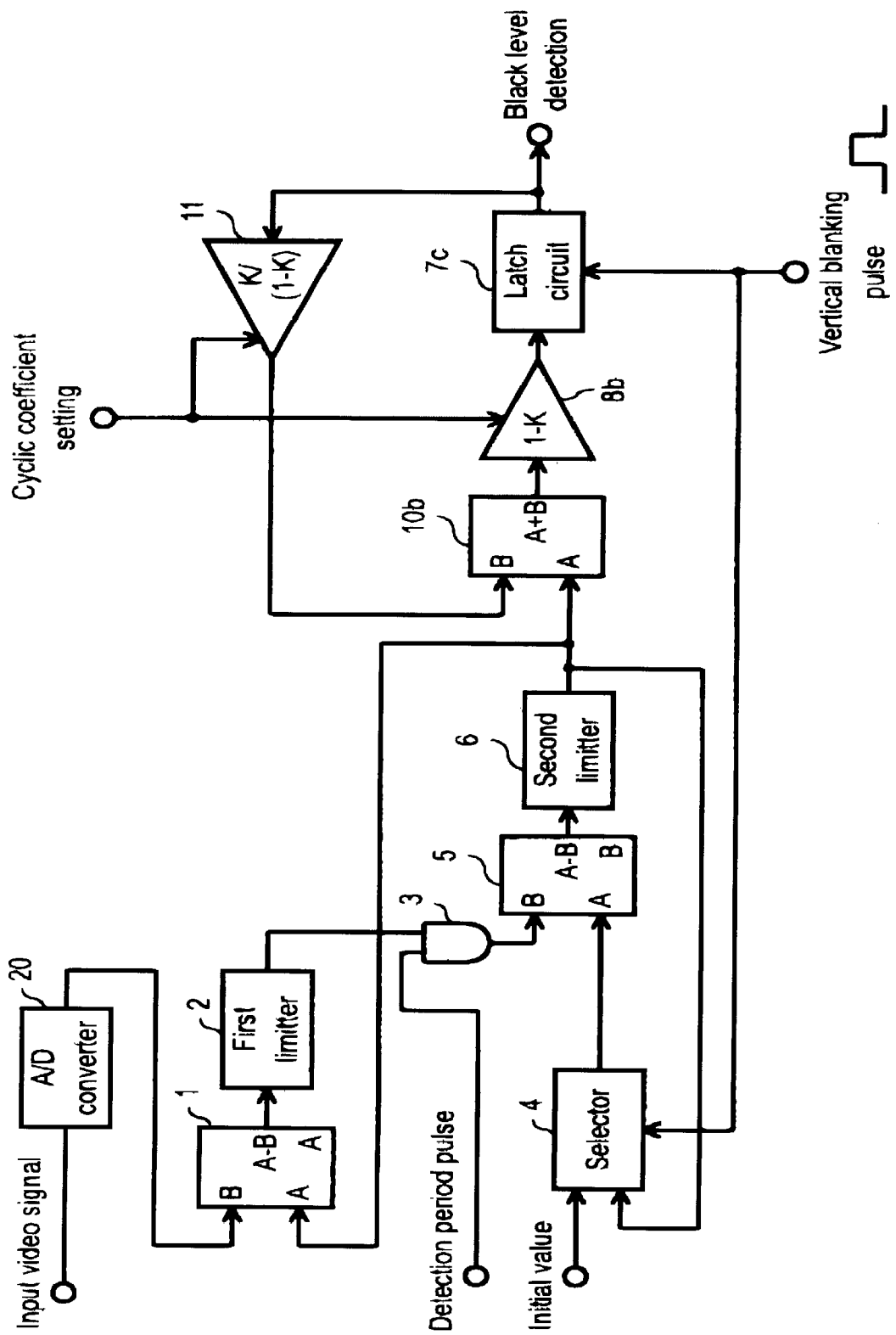

FIG. 5 is a block diagram of a black level detection circuit of a video signal according to Embodiment 3 of the present invention.

Figure 6:
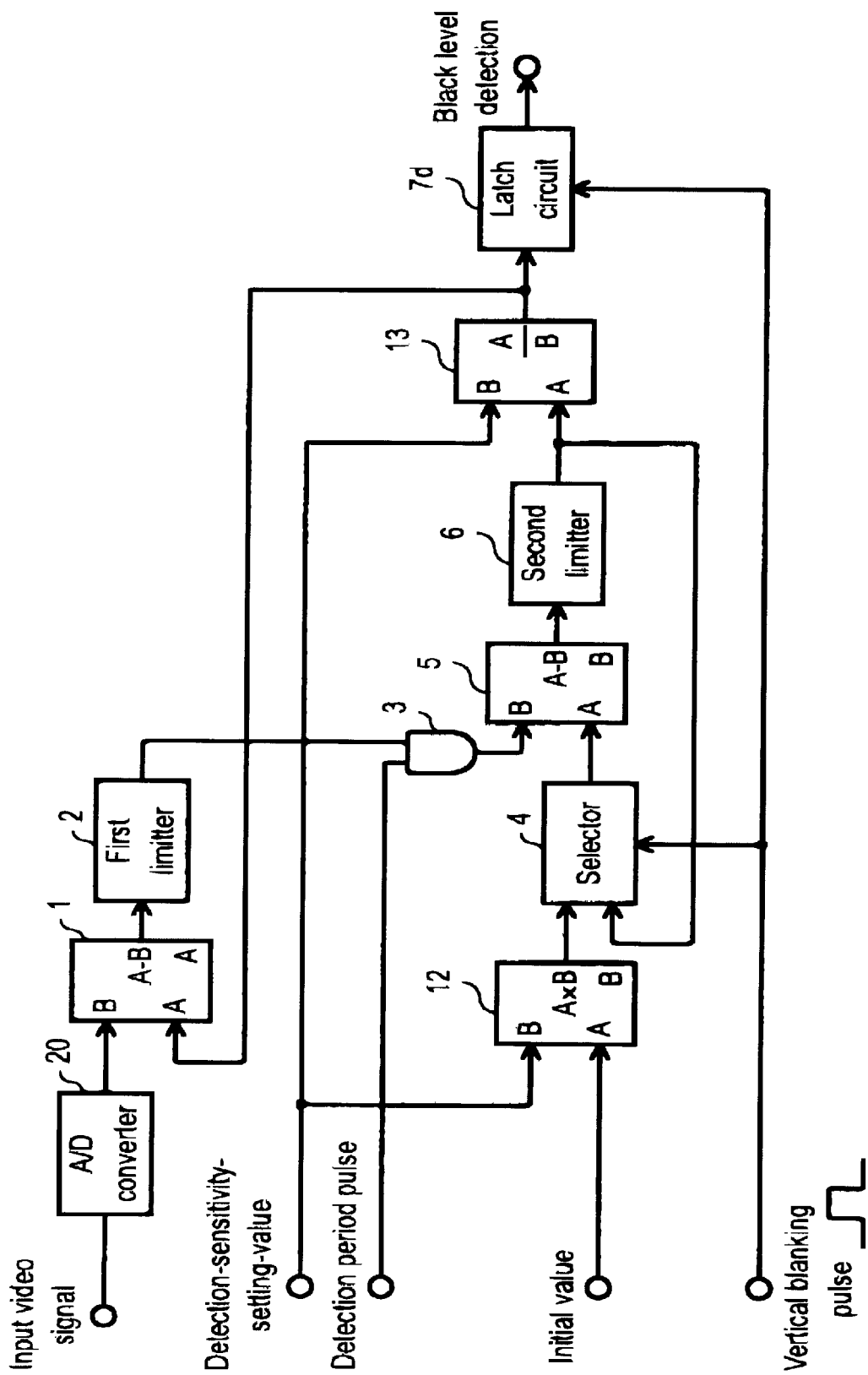

FIG. 6 is a block diagram of a black level detection circuit of a video signal according to Embodiment 4 of the present invention.

Figure 7:
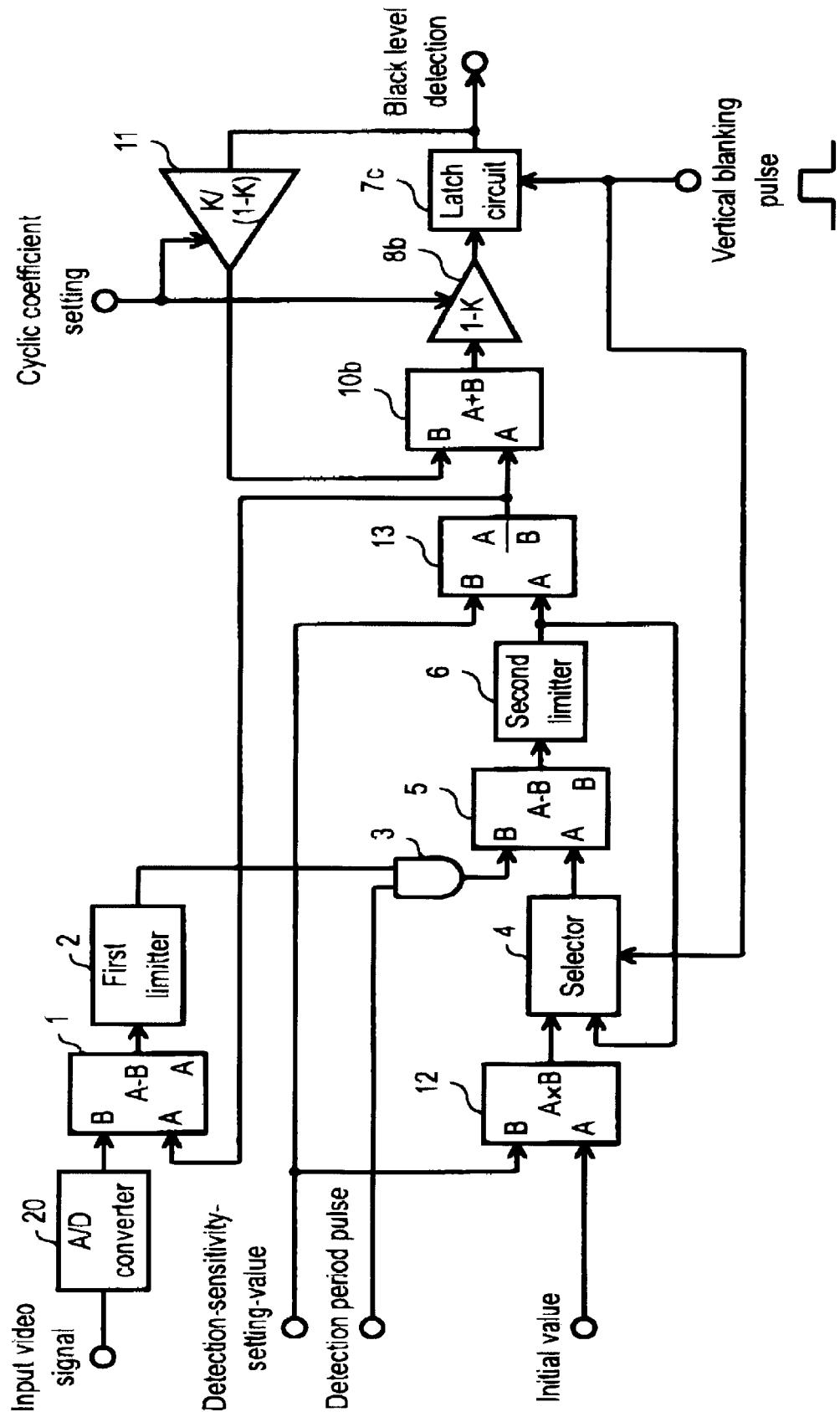

FIG. 7 is a block diagram of a black level detection circuit of a video signal according to Embodiment 5 of the present invention.

Figure 8:
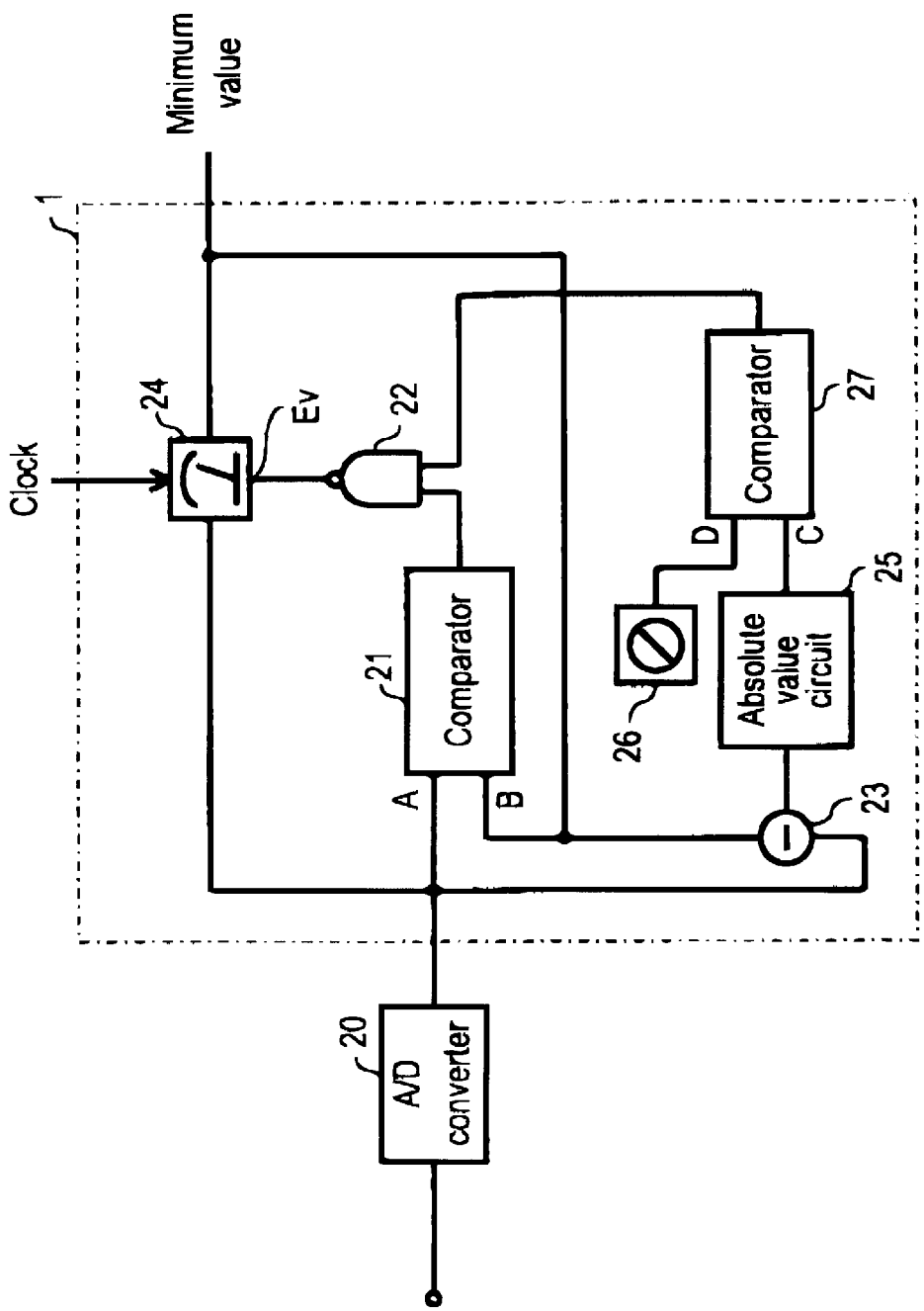

FIG. 8 is a block diagram of a conventional black level detection circuit of a video signal.

DESCRIPTION OF THE PREFERRED EMBODIMENTS

Exemplary embodiments of the present invention are described hereinafter by referring to FIG. 1 through FIG. 7.

Embodiment 1

Figure 1:
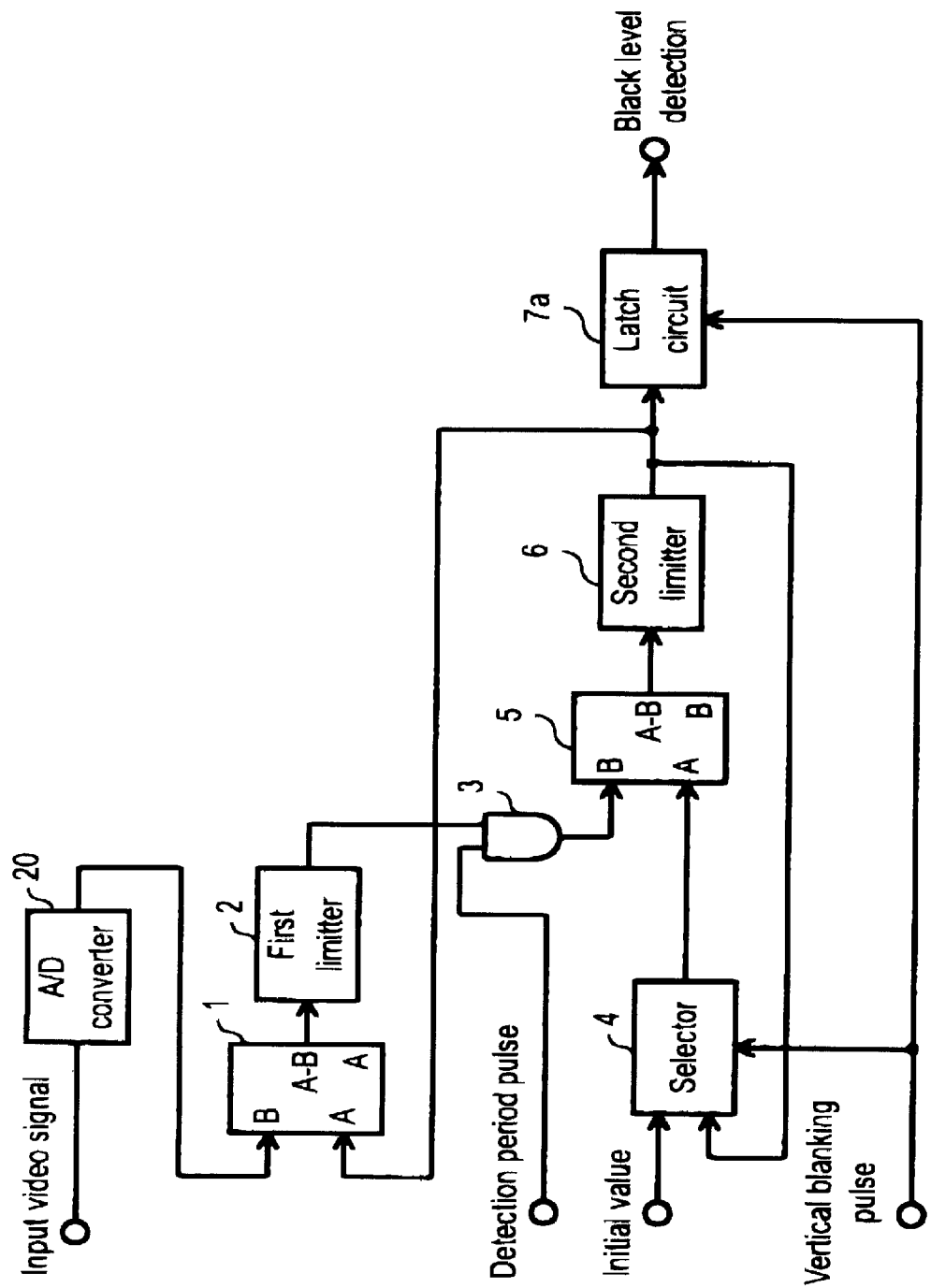
FIG. 1 is a block diagram of a black level detection circuit of a video signal according to Embodiment 1 of the present invention.

FIG. 1 is a block diagram of a black level detection circuit of a video signal used in Embodiment 1 of the present invention. FIG. 2 shows a waveform depicting an exemplary operation of Embodiment 1.

In FIG. 1, an A/D converter is denoted by 20. A subtracter 1 receives an output data from a second limitter 6 at its terminal A as well as a video signal at its terminal B, and outputs a result of subtracting the video signal from the output data of the second limitter 6. A first limitter 2 receives an output from the subtracter 1, and outputs "0" when the reception value is not more than "0", and outputs the reception value as it is (i.e., the actual reception value) when the reception value is more than "0". Difference detection circuit comprises the A/D converter 20, the subtracter 1 and the limitter 2.

An AND gate 3 receives a detection period pulse which equals "1" during a period of detecting a black level, and equals "0" during other periods. And gate 3 also receives an output from the first limitter 2, and outputs "0" when the detection period pulse equals "0", or the output from the first limitter 2 as it is when the detection period pulse equals "1". The AND gate functions as the switching circuit.

A selector 4 receives an initial value of the black of the video signal, an output from the second limitter 6 and a vertical blanking pulse which is generated once in a vertical blanking period of the video signal, and outputs an initial value during the vertical blanking pulse, and outputs the output data from the second limitter 6 for other periods.

A subtracter 5 receives an output from the selector 4 at its terminal A as well as an output from the AND gate at its terminal B, and outputs a result of subtracting the AND gate output from the selector 4 output. The second limitter 6 receives an output from the subtracter 5, and outputs "0" when the reception value is not more than "0", and outputs the reception value as it is when the reception value is more than "0". The output of the second limitter 6 is fed into the terminal A of the subtracter 1. The minimum value renewal circuit comprises the selector 4, the subtracter 5 and the second limitter 6.

A latch circuit 7a receives the output from the second limitter 6 and is triggered by the vertical blanking pulse to output a renewed minimum value as the black level. The latch 7a functions as latch circuit.

An operation of the above black level detection circuit of the video signal is detailed by referring to FIG. 2 The A/D converter of FIG. 1 converts an input video signal of an analog value shown in FIG. 2A into a digital value, whereby the input video signal is quantized. FIG. 2A depicts that a brightness level of the video signal (a data portion only, excluding waveforms of a synchronous signal and the like) is greater at an upper portion and smaller at a lower portion.

The subtracter 1 receives the output data from the second limitter 6 as well as the fed video signal, and subtracts the video signal from the output of the second limitter 6, then outputs a result of the subtraction.

The first limitter 2 receives an output from the subtracter 1, and outputs "0" when the reception value is not more than "0", and outputs the reception value as it is for other cases. In other words, the first limitter 2 outputs the fed data only when the fed video signal is smaller than the output data from the second limitter 6.

The AND gate 3 receives the detection period pulse which equals "1" during a period of detecting the black level of the video signal and equals "0" for other periods as shown in FIG. 2B. AND gate 3 also receives the output from the first limitter 2, and then outputs "0" when the detection period pulse equals "0", and outputs the output from the first limitter 2 as it is when the detection period pulse equals "1". An object of this structure is to operate the circuit of the present invention only during a period when the black level is desirably detected, i.e. a period where a video signal data excluding the periods of the synchronous signal and the equalizing pulse is fed.

The selector 4 receives an initial value of the minimum value of the video signals, an output of the second limitter 6, and the vertical blanking pulse which is generated once in the vertical blanking period as shown in FIG. 2C, and outputs the initial value during the vertical blanking pulse, and outputs the output from the second limitter 6 for other periods. An object of this structure is to initialize each minimum value of the video signal detected in the previous frame or field. In the circuit of the present invention, the initial value of the video signal is given by the initial value fed into the selector 4, and when a video signal smaller than the initial value does not come, the initial value is output as the black level of the video signal.

The subtracter 5 receives the output from the selector 4 as well as the output from the AND gate 3, and outputs a result of subtracting the output of the AND gate 3 from the output of the selector 4. In other words, the subtracter 5 subtracts a difference between the output data of the second limitter 6 and the fed video signal from the output data of the selector 4 when the fed video signal is smaller than the output from the selector 4 (i.e. the initial value, or the output data from the second limitter 6).

The second limitter 6 receives the output from the subtracter 5, and outputs "0" when the reception value is not more than "0", and outputs the reception value as it is for other cases (the output from the second limitter 6 is fed into the terminal A of the subtracter 1.) According to this operation, if an extraordinary small video signal is fed due to an influence of a noise, the second limitter 6 prevents the minimum value from being a negative. As shown in FIG. 2D and FIG. 2E, when the detection period pulse equals "1", the minimum value, which is output from the second limitter 6, is renewed every time the video signal is fed. The output data from the second limitter 6 is expressed in a digital form in FIG. 2D, while it is expressed in an analog form in FIG. 2E. When the detection period pulse equals "0", the output data stays same with no changes.

The latch circuit 7a receives the output from the second limitter 6, and is triggered by the vertical blanking pulse to output a detection result. The output data from the latch circuit 7a changes as shown in FIG. 2F. FIG. 2D and FIG. 2E depict that the data latched by the latch circuit 7a is triggered by the vertical blanking pulse to be renewed from Z0 to Z1. At the same time, the selector 4 outputs the initial value thereby the output data from the second selector 6 changes from Z1 to the initial value.

This initial value has been set lest a brightness signal should be excessively compensated in the following step by the detected black level, and yet, this initial value is still fine adjustable in order to get the most suitable picture.

In this Embodiment, the AND gate functioning as the switching circuit is placed after the first limitter 2, however, the AND gate may be placed after the subtracter 5 or after the second limitter 6 to output an input data during a period when the detection period pulse is fed, or to retain the outputs until then for other periods.

Another modification could be implemented as follows: Remove the AND gate 3, feed the output from the second limitter 6 into the terminal B of the subtracter 5, then feed an output from the AID converter 20 as well as a reverse signal of the detection period pulse into an OR gate, feed an output from the OR gate into the terminal B of the subtracter 1. As a result, the output from the A/D converter 20 is fed into the subtracter 1 only during a period when the detection period pulse is fed.

According to this Embodiment and the modifications, the above structure enables a data to be output only during the detection pulse period, whereby the black level of the digitized video signal can be accurately detected for each frame or each field.

Embodiment 2

FIG. 3 is a block diagram of a black level detection circuit of a video signal used in Embodiment 2 of the present invention. The different between Embodiment 2 and Embodiment 1 is that the latch circuit 7a used in Embodiment 1 is replaced with a cyclic filter having a cyclic coefficient "k". The cyclic filter comprises the following elements:

(a) an amplifier 8a for receiving an output from the second limitter 6 and a setting value which sets a gain "k" of the amplifier, and for amplifying the output from the second limitter 6 by (1−k) according to the setting value, where 0<k<1, b) an amplifier 9 for receiving an output of a black level detection and the setting value which sets the gain "k" of the amplifier, and for amplifying the output of the black level detection by "k" according to the setting value, (c) an adder 10a which outputs an addition result of an output from the amplifier 8a and an output from the amplifier 9, and (d) a latch circuit 7b which receives an output data from the adder 10a and is triggered by a vertical blanking pulse to output the output data of the adder 10a.

Other elements are the same as those used in Embodiment 1, descriptions of those elements are thus omitted.

The difference in operation of Embodiment 2 from Embodiment 1 is described hereinafter by referring to FIG. 4

The amplifier 8a receives the output from the second limitter 6 as well as the setting value which sets the gain "k" of the amplifier, and amplifies the output from the second limitter 6 by (1−k) times according to the setting value.

The amplifier 9 receives the output of the black level detection as well as the setting value which sets the gain "k" of the amplifier, and amplifies the output of the black level detection by "k" times according to the setting value.

The adder 10a outputs an addition result of two factors, i.e. one is a second limitter output running through the amplifier 8a, another one is a latch circuit 7b output running through the amplifier 9, and these two outputs are weighted before being added with each other.

The latch circuit 7b receives an output from the adder 10a, and is triggered by the vertical blanking pulse to tap off the output of the black level detection.

FIG. 4A shows vertical blanking pulses similar to those in FIG. 2C. FIG. 4B shows how the output data from the latch circuit 7a in Embodiment 1 changes depending on an input video signal, and FIG. 4C shows that of the latch circuit 7b in Embodiment 2 when the same video signal is fed to. Both are shown in an analog form.

For instance, when the amplifying coefficient "k" equals "0.5", the adder 10a averages the two outputs, i.e. one is a black level detected in the previous field or frame, namely the output from the latch circuit 7b, another one is the output data from the second limitter 6. In other words, when a video signal is fed into a frame or a field in the case of FIG. 4B, though the video signal change the output data from the latch circuit 7a from such a large difference Z0 to Z1, the output data from the latch circuit 7b decreases step by step such as from Z1' to Z2', Z3' and Z4'.

Therefore, in contrast to Embodiment 1, when a video signal which changes an output data sharply is fed into the above structure of Embodiment 2, the output data does not change sharply but changes gradually field by field or frame by frame.

Comparing with a structure where the cyclic filter is added to the structure of Embodiment 1, Embodiment 2 can save one latch circuit because the latch circuit 7b works as a delay element of the cyclic filter and also works as a latch function for the current minimum value of the video signal. As a result, a faster response by one field or one frame can be expected in Embodiment 2.

The delaying function of the filter can restrain a detected black level from changing sharply, and thus an optimum black level for one field or one frame can be detected.

According to Embodiment 2, the cyclic filter can restrain the black level of the video signal in a digital form from changing sharply, whereby the black level can be detected correctly without being affected by noises.

Embodiment 3

FIG. 5 is a block diagram of a black level detection circuit of a video signal used in Embodiment 3 of the present invention.

The difference between Embodiment 3 and Embodiment 2 is that the cyclic filter used in Embodiment 2 is replaced with another cyclic filter having a cyclic coefficient "k", and comprising an amplifier 8b, an adder 10b, an amplifier 11, and a latch circuit 7c. The cyclic filter of Embodiment 3 exhibits improved performance than the cyclic filter used in Embodiment 2. As shown, in the cyclic filter of Embodiment 3, the input to the terminal A of the adder 10b (corresponding to the multiplier 8a in Embodiment 2) is fed directly from the second limitter 6, not through the multiplier, thus quantization error is less deteriorated, and as a result, bit accuracy becomes higher. Other elements used in Embodiment 3 are the same as those used in Embodiment 1. Descriptions of these elements are thus omitted.

Operation of the black level detection circuit of Embodiment 3 which is different from Embodiment 1 is detailed hereinafter.

The amplifier 11 receives an output of a black level detection as well as a setting value which sets a gain "k" of the amplifier, and amplifies the output of the black level detection by k/(1−k) times according to the setting value.

The adder 10b receives an output from the amplifier 11 as well as an output from the second limitter 6, adds these two reception values, and outputs the result of this addition.

The amplifier 8b receives an output from the adder 10b as well as the setting value which sets the gain "k" of the amplifier, and amplifies the output from the adder 10b by (1−k) times.

The latch circuit 7c receives an output from the amplifier 8b, and is triggered by a vertical blanking pulse to output a result of the black level detection. Thus, the output data is restrained from changing sharply due to noises, and also the output data can be more accurately calculated. As a result, the black level is detected so that more natural video control can be achieved.

According to Embodiment 3, the black level of the video signal in a digital form can be detected more accurately without being affected by noises, and with less errors due to round off of the cyclic filter.

Embodiment 4

FIG. 6 is a block diagram depicting a black level detection circuit of a video signal used in Embodiment 4 of the present invention.

The difference between Embodiment 4 and Embodiment 1 is that a multiplier 12 and a divider 13 are provided. The multiplier 12 receives at its terminal B a detection-sensitivity-setting-value which sets a detection sensitivity of the first limitter 2 (i.e. an output of the difference detection circuit), and at its terminal A an initial value, then multiples these two reception values before outputting this multiplication result to the selector 4. The divider 13 receives at its terminal B the detection-sensitivity-setting-value, and at its terminal A an output from the second limitter 6, and divides the output from the second limitter 6 by the detection-sensitivity-setting-value before outputting this division result to the latch circuit 7b.

The minimum value renewal circuit comprises the multiplier 12, selector 4, subtracter 5, second limitter 6, and divider 13. The minimum value renewal circuit divides the difference output from the AND gate 3 by the detection-sensitivity-setting-value, and adjusts the detection sensitivity of the difference detection circuit.

The other elements used in Embodiment 4 are the same as those used in Embodiment 1. Descriptions of them are thus omitted.

The operation of the above black level detection circuit of Embodiment 4 is detailed hereinafter by referring FIG. 6:

The A/D converter 20 quantizes an input video signal. The subtracter 1 receives an output from the divider 13 at its terminal B, and the video signal at its terminal A, and subtracts the video signal from the output of the divider 13 before outputting this subtraction result.

The first limitter 2 receives an output from the subtracter 1, and outputs "0" when the reception value is not more than "0", and outputs the reception value as it is for other cases. In other words, the first limitter 2 outputs the input data at the terminal B only when the input data at the terminal B is smaller than that at the terminal A.

The AND gate 3 receives the detection period pulse which stays at "1" only when the black level of the video signal is detected, and stays at "0" for other cases, and also receives the output from the first limitter 2. AND gate 3 outputs "0" when the detection period pulse stays at "0", and outputs the output from the first limitter 2 as it is when the detection period pulse stays at "1". This structure enables the black level detection circuit of the present invention to work only during a desirable period of detecting the black level of the video signal.

The multiplier 12 receives an initial value of the minimum value of the video signals as well as the detection-sensitivity-setting-value which sets the detection sensitivity for the black level of the video signal, multiplies these two reception values, and outputs the multiplication result. This step is for setting the detection sensitivity at the next step. The greater the detection-sensitivity-setting-value becomes, the lower the detection sensitivity, and the black level detection circuit is more stable against noises.

The selector 4 receives the output from the multiplier 12, the output from the second limitter 6 and the vertical blanking pulse, and then outputs the output data from the multiplier 12 during the vertical blanking pulse, or outputs the output data from the second limitter 6 for other cases. This structure enables the minimum value of the video signal detected in the previous frame or field to be initialized every present frame or field. According to the present invention, the minimum value of the video signal is initialized by the initial value fed into the multiplier 12, and if a video signal smaller than the initial value is not fed, the initial value per se is to be output as the black level of the video signal.

The subtracter 5 receives at its terminal A the output from the selector 4, at its terminal B the output from the AND gate 3, and subtracts the AND gate 3 output from the selector 4 output, then outputs this subtraction result. In other words, the subtracter 5 subtracts the difference between the output data from the second limitter 6 and the input video signal from the output data of the selector 4 only when the input video signal is smaller than either the output from the selector 4, i.e. the initial value, or the output data from the second limitter 6.

The second limitter 6 receives an output from the subtracter 5, and outputs "0" when the reception value is not more than "0", and outputs the reception value as it is for other cases (the output from this second limitter 6 is fed into the terminal A of the subtracter 1.) In other words, an extraordinary small video signal is fed due to influence of noises, the second limitter 6 can prevent the minimum value from being at a negative.

The divider 13 receives at its terminal A the output from the second limitter 6, at its terminal B the detection-sensitivity-setting-value, and divides the output from the second limitter 6 by the detection-sensitivity-setting-value. This operation cancels the multiplication at the multiplier 12 to restore the output to the original scale.

The detection sensitivity is therefore adjustable a result of the operations of the multiplier 12 and the divider 13.

The latch circuit 7d receives the output from the divider 13, and is triggered by the vertical blanking pulse to output the detection result.

The detection-sensitivity-setting-value is thus a base of adjusting the detection sensitivity. When the detection sensitivity is high (a response time constant is small), a capability of reducing noises lowers, while a quicker response can be expected to an abrupt change of videos. On the other hand, when the detection sensitivity is low (a response time constant is great), the capability of reducing noises strengthens, while a slow response should be expected to the abrupt change of videos. Therefore, an intermediate value is appropriately used as the detection-senstivity-setting-value, which had better be adjustable to users' taste.

Embodiment 4 as described above proves that a presence of the detection-sensitivity-setting-value can control a detecting sensitivity of the black level of the video signal, whereby the black level of the video signal in digital terms can be accurately detected every frame, or field without being affected by noises.

In Embodiment 1, if a divider is placed before and after the AND gate 3 respectively, and the output data from the first limitter 2 or the output data from the AND gate 3 is divided by the detection-sensitivity-setting-value, the same effect of Embodiment 4 can be expected. The reason why the structure shown in FIG. 6 is utilized is to prevent errors due to round off, for the data handled in the present invention is in a digital form.

Embodiment 5

FIG. 7 is a block diagram depicting a black level detection circuit of a video signal used in Embodiment 5 of the present invention. The difference between Embodiment 5 and Embodiment 4 is that the cyclic filter used in Embodiment 3 is added to Embodiment 4. As shown, the cyclic filter comprises the latch circuit 7c, the amplifier 8b, the amplifier 11 and the adder 10b.

A black level detection circuit of Embodiment 5 has both functions of the detection-sensitivity-adjusting function of Embodiment 4 and the delaying function of Embodiment 3.

In accordance with the foregoing embodiments, the present invention can accurately detect the black level of the video signal in a digital form without being affected by noises.

Although the present invention has been described in conjunction with the foregoing exemplary embodiments, it is appreciated that the invention may be implemented in a variety of other ways. Consequently, it is to be understood that the particular embodiments shown and described by way of illustration are in no way intended to be considered limiting. Reference to the details of these embodiments is not intended to limit the scope of the claims.

What is claimed is:

1. A black level detecting circuit of a video signal which detects a black level of an input video signal, said circuit comprising:

(a) a minimum value renewal circuit for detecting a minimum value of said video signal during a black level detection period of said video signal, and for initializing said minimum value during a vertical blanking period, said minimum value renewal circuit comprising a difference detection circuit which compares said input video signal with a present minimum value of video signals, and detects a difference between said input video signal and the present minimum value of the video signals only when said input signal is smaller than the present minimum value of the video signals, and (b) a latch circuit which latches and taps off an output of said minimum value renewal circuit during said vertical blanking period.

2. The black level detection circuit of the video signal of claim 1, wherein said minimum value renewal circuit further comprises:

a switching circuit which taps off an output of said difference detection circuit during a black level detection period of said input video signal, said minimum value renewal circuit operative for tapping off a minimum value renewed from the present minimum value of the video signals by correcting the present minimum value by using an output of said switching circuit, and initializes the renewed minimum value during the vertical blanking pulse.

3. The black level detection circuit of the video signal of claim 2, wherein said minimum value renewal circuit receives a detection-sensitivity-setting value which sets a detection sensitivity of said difference detection circuit, and adjusts the detection sensitivity thereof by calculating the output of said switching circuit using said detection-sensitivity-setting value.

4. A black level detecting circuit of a video signal which detects a black level of an input video signal, said black level detecting circuit comprising;

a difference detection circuit which compares said input video signal with a current minimum value of said video signal, and which outputs a difference between said input video signal and the current minimum value of said video signal only when said input video signal is smaller than the current minimum value of the video signal, a switching circuit which outputs the output of said difference detection circuit during a black level detection period of said input video signal, a minimum value renewal circuit which outputs the current minimum value of the video signals, said minimum value renewal circuit operative for updating the current minimum value of the video signal upon receipt of a vertical blanking pulse, and latch means which latches and outputs an output of said minimum value renewal circuit during a vertical blanking period.

5. The black level detecting circuit of a video signal according to claim 4, wherein said minimum value renewal circuit receives a detection-sensitivity-setting value which sets a detection sensitivity of said difference detection circuit, and adjusts the detection sensitivity thereof by calculating the output of said switching circuit by using said detection-sensitivity-setting-value.

6. The black level detecting circuit of a video signal according to claim 4, wherein said difference detection circuit comprises: an A/D converter which provides said input video signal with an A/D conversion, a first subtracter which subtracts an output of said A/D converter from the output of said minimum value renewal circuit, and a first limiter which outputs "0" when an output of said first subtracter is not more than "0", and outputs the output of said first subtracter for other cases, said switching circuit comprising an AND gate operative for receiving a detection period pulse indicating a period for detecting the black level of said input video signal, and for outputting "0" when no said detection period pulse arrives, and outputting an output of said first limiter when said detection period pulse arrives.

7. The black level detecting circuit of a video signal according to claim 6, wherein said minimum value renewal circuit comprises:

a selector which receives the current minimum value of said video signal and an initial value of the minimum value, said selector outputting said initial value when receiving the vertical blanking pulse and outputting the current minimum value in the absence of said vertical blanking pulse, a second subtracter which receives an output of said selector and the output of said switching circuit, said second subtracter operative for subtracting the output of said switching circuit from the output of said selector, and a second limitter which receives an output of said second subtracter, and which outputs "0" when the output thereof is not more than "0", and outputs the output thereof for other cases, said second limitter operative for renewing the current minimum value of said video signal, wherein said latch means comprises a latch circuit operative for receiving an output of said second limitter, and for latching the output of said second limitter upon receipt of said vertical blanking pulse.

8. The black level detecting circuit of a video signal according to claim 6, wherein said minimum value renewal circuit comprises:

a multiplier which receives said detection-sensitivity-setting-value and an initial value of the current minimum value, and multiplies said detection-sensitivity-setting-value by said initialized minimum value, a divider which divides an input value of the video signal by said detection-sensitivity-setting-value, and which outputs the current minimum value of the video signal, a selector which receives the current minimum value of the video signal and an output of said multiplier, said selector outputting the output of said multiplier upon receipt of said vertical blanking pulse, and outputting the output of a second limiter in the absence of said vertical blanking pulse, and a second subtracter which receives an output of said selector and the output of said switching circuit, said second subtracter subtracting the output of said switching circuit from the output of said selector, said second limitter receiving an output of said second subtracter, said second limitter outputting "0" when the output of said second subtracter is not more than "0", and outputting the output of said second subtracter for other cases, wherein said latch means comprises a latch circuit operative for receiving an output of said second limitter, and for latching the output of said second limitter upon receipt of said vertical blanking pulse.

9. The black level detecting circuit of a video signal according to claim 7, wherein said latch means weights an output of said latch circuit and an output of said minimum value renewal circuit, adds these two weighted outputs, and outputs the addition result during said vertical blanking period.

10. The black level detecting circuit of a video signal according to claim 9, wherein said latch means includes a cyclic filter comprising:
   a latch circuit which latches an input value when receiving said vertical blanking pulse,
   a first amplifier having a gain "k", said first amplifier amplifying an output of said latch circuit by "k" times,
   a second amplifier having a gain "1−k", said second amplifier amplifying the output of said second limitter by "1−k" times, and
   an adder which adds an output of said first amplifier and an output of said second amplifier and outputs an addition result to said latch circuit.

11. The black level detecting circuit of a video signal according to claim 9, wherein said latch means includes a cyclic filter comprising;
   a latch circuit which latches an input value when receiving said vertical blanking pulse,
   a first amplifier having a gain "k/1−k", said first amplifier amplifying an output of said latch circuit by "k/1−k" times,
   an adder which adds an output of said amplifier and an output of said second limitter, and
   a second amplifier having a gain "1−k", said second amplifier amplifying an output of said adder by "1−k" times and outputs an amplified result to said latch circuit.

12. The black level detecting circuit of a video signal according to claim 4, wherein said difference detection circuit comprises:
   an A/D converter which provides said input video signal with an A/D conversion,
   a first subtracter which subtracts an output of said A/D converter from the output of said minimum value renewal circuit, and
   a first limitter which outputs "0" when an output of said first subtracter is not more than "0", and outputs the output of said first subtracter for other cases, and
   said minimum value renewal circuit comprises:
      a selector which receives the current minimum value of said video signal and an initial value of the minimum value, said selector outputting said initial value when receiving the vertical blanking pulse and outputting the current minimum value in the absence of said vertical blanking pulse,
      a second subtracter which receives an output of said selector and the output of said switching circuit, said second subtracter operative for subtracting the output of said switching circuit from the output of said selector, and
      a second limitter which receives an output of said second subtracter, and which outputs "0" when the output thereof is not more than "0", and outputs the output thereof for other cases, said second limitter operative for renewing the current minimum value of said video signal,
   said switching circuit comprising an AND gate operative for receiving a detection period pulse indicating a period for detecting the black level of said input video signal, and for outputting "0" when no said detection period pulse arrives, and outputting an output of said second subtracter when said detection period pulse arrives.

13. The black level detecting circuit of a video signal according to claim 4, wherein said difference detection circuit comprises:
   an A/D converter which provides said input video signal with an A/D conversion,
   a first subtracter which subtracts an output of said A/D converter from the output of said minimum value renewal circuit, and
   a first limitter which outputs "0" when an output of said first subtracter is not more than "0", and outputs the output of said first subtracter for other cases, and
   said minimum value renewal circuit comprises:
      a selector which receives the current minimum value of said video signal and an initial value of the minimum value, said selector outputting said initial value when receiving the vertical blanking pulse and outputting the current minimum value in the absence of said vertical blanking pulse,
      a second subtracter which receives an output of said selector and the output of said switching circuit, said second subtracter operative for subtracting the output of said switching circuit from the output of said selector, and
      a second limitter which receives an output of said second subtracter, and which outputs "0" when the output thereof is not more than "0", and outputs the output thereof for other cases, said second limitter operative for renewing the current minimum value of said video signal,
   said switching circuit comprising an AND gate operative for receiving a detection period pulse indicating a period for detecting the black level of said input video signal, and for outputting "0" when no said detection period pulse arrives, and outputting an output of said second limitter when said detection period pulse arrives.

* * * * *